United States Patent Office 2,880,096
Patented Mar. 31, 1959

2,880,096
CEMENT COMPOSITIONS AND PROCESS OF CEMENTING WELLS

James R. Hurley, Bartlesville, Okla., assignor to Phillips Petroleum Company, a corporation of Delaware No Drawing. Application December 6, 1954
Serial No. 473,174

17 Claims. (Cl. 166—31)

This invention relates to cement compositions and processes of cementing wells. In one aspect it relates to such compositions and processes in which a first agent is employed to increase the cement thickening time of a hydraulic cement and reduce the water loss, and a second agent is employed to decrease the resulting cement thickening time without losing any substantial amount of water loss reduction value of said first agent. To the extent that the second agent is added, the net result is a reduced water loss cement, along with a regulated cement thickening time which may be greater, equal to, or less than the normal thickening time of said hydraulic cement in the absence of both of said agents and less than the thickening time when only the first agent is present. Another aspect is to provide a cement composition containing in addition to these two agents, considerable amounts of bentonite, and lightweight aggregate, such as diatomaceous earth.

It has been found that the addition of said first agent, sodium carboxymethyl hydroxyethyl cellulose mixed ether for example, to cement composition aqueous slurries containing hydraulic cement, such as Portland cement, has two valuable effects, namely, reducing the water loss from such slurries to adjacent and contacting porous, pervious, earth formations by filtration, known to the art as water loss reduction, and increasing the thickening time of the cement, known to the art as the time until the consistency of the slurry reaches 100 poises. At the same time the time of initial set and final set are also somewhat retarded, but it is preferred to refer to thickening time as this has a closer relation to the ability of pumps to pump the cement down the well, which ability is obviously gone somewhat before initial set is reached. Thickening time is tested under API Code RP 10B. Water loss is tested under API Code 29, which was drafted for drilling muds.

However, I have found that said first agent in reducing the water loss often results in a longer thickening time than necessary for good operation, which results in having to hold pressure on a well beyond the normal quitting time of the men on the work shift that cemented the well, which results in overtime payments and also the danger of losing pressure through some accident before the cement takes its initial set. Attempts to add a second agent to reduce the thickening time in the past have all been failures, in that while the thickening time was reduced, the water loss was also increased, and much, or all of the value of the first agent was lost. It is important to have a low water loss, as otherwise the cement slurry will dehydrate and set prematurely when it contacts a porous and pervious formation, especially when the drilling mud cake has been removed by scrapers preparatory to cementing the well, resulting in pump failure under increasing pressure to place the cement slurry properly throughout the entire extent of the well that should be cemented in order to do a successful well cementing job.

One object of the present invention is to provide a suitable hydraulic cement aqueous slurry, and suitable processes employing the same, for cementing casing in wells, for squeeze cementing in wells, and for grouting cracks, fractures or voids in natural formations, such as in wells, or in man-made formations such as dams, breakwaters, walls and massive foundations and structures of all types.

Another object of this invention is to provide a dry hydraulic cement powder which is a novel composition of matter, and which may be mixed with water to form an aqueous cement slurry which is a novel composition of matter and which has at least one of the following useful properties: a low water loss, an extended thickening time, a relatively low specific gravity, a specific gravity in the slurry form approximately that of well drilling mud, and/or can be perforated with minimum cracking or shattering.

Further objects of the invention reside in the provision of a slurry of the above cement.

These and further objects of the invention will be more readily apparent in the following description.

In the cementing of oil wells it is customary to mix a hydraulic cement, for example a Portland or Portland-type cement, with the requisite amount of water to form a pumpable, neat slurry, and to pump the mixture into the well and down the hole into the place where it is desired to have it harden. In present oil well drilling practice, with wells commonly ranging from 6,000 to 12,000 feet or more in depth, using a substantially heavier cement slurry than the drilling mud it replaces may result in forcing the cement out into the formation due to collapse of a friable formation, or displacement of the fluid in said formation by the heavier cement slurry, with the result that much cement is lost out into the formation instead of cementing much higher in the well in the annulus between the casing and the wall of the well.

It is customary to gun perforate through the casing and cement into the oil formation as shown at 38 of Figure 5 of C. C. Brown 2,114,521 of April 19, 1938. With cements of the prior art, the bullets tend to shatter the cement or crack it radially around the holes, with the result that the cement seal is broken and water can enter from a water formation in the oil, entering the perforations from the oil formation by traveling along these cracks. Obviously gas, oil and water under high pressure can travel to places above or below that they should not reach, and a shattered or cracked cement job is troublesome, dangerous and undesirable from an engineering, economic and legal viewpoint, the latter as laws often require perfect cementing between formations containing different fluids.

Everything which is said applying to natural formations in wells applies also in some degree to man-made formations being grouted, and the word "formation" as used herein is regarded as generic to natural earth formations, geological formations, and man-made formations such as structures.

It is not believed necessary to have a drawing, or to describe minutely the well known cementing operations disclosed in such patents as U.S. 2,795,507 and 8.

By hydraulic cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic cements. Hydraulic cements include hydraulic limes, grappier cements, puzzolan cements, natural cements and Portland cements. Puzzolan cements include slag cements made from slaked lime and granulated blast furnace slag. Because of its superior strength Portland cement is preferred among the hydraulic cements, but as the art of cements recognizes hydraulic cements as a definite class, and as results of value may be obtained with any member of that class, it is desired to claim all hydraulic cements. In addition to the ordinary construction grades of Portland cement or other hydraulic cements, modified hydraulic cements and Portland cements designated as high-early-strength cement, heat resistant cement, and slow-setting cement may be used in the present invention.

The agent is a mixture of two or more of the following ingredients, which have been found operable and useful in practicing the invention in the percentages given in the column "Operable Amounts," and to give best results in the percentages given in the column headed "Preferred Amounts" of the following Table I. The percentages are all weight percentages of the weight of the dry hydraulic cement employed in the cement composition.

TABLE I

| Materials | Operable Amounts, percent | Preferred Amounts, percent |
| --- | --- | --- |
| Bentonite | 0 to 5 | 1 to 4 |
| Aggregate | 0 to 70 | [1] 15 to 50 |
| CMHEC [2] | 0.1 to 10 | 0.3 to 3 |
| AM aluminate [3] | 0.3 to 10 | [4] 1 to 7 |

[1] 20% for 12–13.5 pounds per gallon, 40% for 10.5 to 12 pounds per gallon slurry densities, intermediate slurry densities in proportion.

[2] CMHEC is used as an abbreviation for a cement thickening time extending and water loss reducing agent selected from the group consisting of acid carboxyalkyl hydroxyethyl cellulose mixed ethers in which the alkyl group contains one to two carbon atoms, preferably sodium carboxymethyl hydroxyethyl cellulose mixed ether, in which the total substitution per anhydroglucose unit of the cellulose of both carboxyalkyl and hydroxyethyl groups is between 0.5 to 1.75, the hydroxyethyl substitution is from 0.35 to 1.35, and the carboxyalkyl substitution is from 0.15 to 1.2, and all metal, ammonium, amide, and other salts of said mixed ethers, but preferably the alkali metal salts thereof. The amount of CMHECH varies with the amount of aggregate used and ranges from about 0.3 with no aggregate to 3% with 60% aggregate, and other amounts in proportion. However, 0.1 to 10% gives results of some value in the practice of the invention over the same range of aggregates.

[3] AM aluminate is used as an abbreviation for an alkali metal aluminate, preferably sodium aluminate having the chemical formula of $NaAlO_2$.

[4] The amount used depends on the thickening time desired. For example, 2.6% with 1.5% CMHEC and 40% aggregate (diatomaceous earth, for example) in a well 6000 feet deep.

The amount of water used to make the slurry may vary widely as long as sufficient water is added to make the slurry fluid and pumpable. For example, the invention is operable with about 40 to 400% water by weight of the dry Portland cement, it is preferred to use 54% when no diatomaceous earth aggregate is used, and 220% is preferred when used with 40% diatomaceous earth aggregate, and other mixtures in proportion. Simple tests can be used to determine if there is enough water present to make a pumpable slurry without substantially increasing the water loss. River water can usually be employed, as the invention is not sensitive to the amount of salts, silt, or clay, in river water which has stood in a tank long enough to drop excess mud, and is not hurt much by that much mud even if not removed.

The bentonite employed may be either hydrated or unhydrated bentonite as weighed in the unhydrated normal state in which bentonite is generally sold and shipped. While it is preferred to use the best commercial grade of unhydrated Wyoming bentonite, any bentonite such as El Paso surface clay, Wilmington slough clay, and all bentonitic clay containing a high percentage of montmorillonites, particularly the sodium salt of montmorillonite are suitable, and the calcium, or other salts of montmorillonites give valuable results in the practice of the invention of the same nature as the sodium salt in somewhat less degree.

The aggregate in Table I is preferably diatomaceous earth, any fairly good grade of the same being suitable. The "Celite" brand of diatomaceous earth is preferred but any technical grade of diatomaceous or infusorial earth such as kieselguhr, guhr, diatomite, tripolite, tellurine, terra silicea, ceyssatite, or fossil flour may be employed. In addition somewhat inferior but nevertheless valuable results may be obtained by the practice of this invention by employing other porous aggregates such as pumice, vermiculite, exfoliated vermiculite, popped pumice, and other light weight aggregates known to the prior art in amounts similar to those given in Table I for diatomaceous earth (Celite).

Acid carboxymethyl hydroxyethyl cellulose mixed ether may be made from cellulose by reacting to form the carboxymethyl portion first and then the hydroxyethyl portion, or vice versa, or both at once. Reacting ethylene oxide with alkali cellulose is the commercial way to make hydroxyethylcellulose, see page 422 of the book "Cellulose Chemistry" by Heuser (1946) (John Wiley & Sons Inc., New York). The reaction is that of addition and is formulated as:

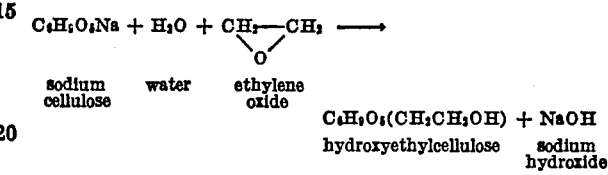

Other methods are mentioned on page 423 of said book. $C_6H_{10}O_5$ is one anhydroglucose unit of which there are many in each cellulose molecule.

On pages 421 and 422 of said book the preparation of carboxymethylcellulose (also known as glycolic acid ether of cellulose) is disclosed. It is formulated as:

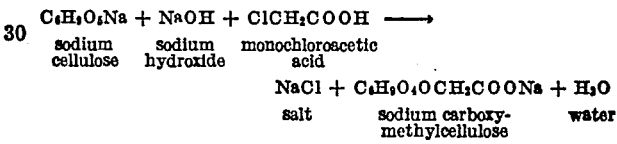

By reacting some of the cellulose hydroxyl groups in a sodium cellulose molecule with ethylene oxide and some with sodium hydroxide and monochloroacetic acid, sodium carboxymethyl hydroxyethyl cellulose mixed ether is formed. This may be converted to acid carboxymethyl hydroxyethyl cellulose mixed ether by reaction with an acid such as nitric acid and removal of the resulting sodium nitrate or other salt by purification, if purification is desired. When used in cement in the present invention, such purification is not always necessary. The substitution of both types of radicals need not be on the same anhydroglucose unit of the molecule; sometimes it is, and sometimes not. Nor is it necessary that all anhydroglucose units be reacted with either, as those units in the molecule that are so reacted will make the molecule active as a cement additive. It is preferred to have a combined substitution of carboxymethyl and hydroxyethyl radicals per anhydroglucose unit averaging from 0.5 to 1.75 in which the carboxymethyl radicals average from 0.5 to 1.2 and the hydroxyethyl radicals average from 0.35 to 1.35 but valuable results are still obtained outside of this range, especially if the mixed ether is water-soluble, or will hydrolyze to give water-soluble salts.

The alkali metal aluminates of Table I, are preferably sodium, potassium and lithium aluminate, most preferably sodium aluminate. It is operable to use from 0.3 to 10%, preferably 1 to 7%, of the alkali metal aluminate, but the amount employed depends on the thickening time desired and the amounts of CMHEC present and generally the deeper the well the less aluminate need be used, and the shallower the well the more will be used. It is easy to make simple batch tests of sample mixtures of the cement at the well site before actually employing the cement and anyone skilled in the art can make these tests. However, the amount employed may be readily estimated from the data given in this application and good results will be obtained without such tests.

*Example A*

The following tests in Table II show that Portland cement to which 0.5% by weight of the dry Portland cement of sodium carboxymethyl hydroxyethyl cellulose mixed ether and 54% water has been added to form an aqueous pumpable slurry, had a water loss of 7.5 ml. in 30 minutes at 100 pounds per square inch pressure in the standard drilling mud filtration tests, and this water loss was not substantially increased any by the addition of 1% of sodium aluminate in run No. 8 whereas the noted percentages of other metal salts raised the water loss of the same cement CMHEC aqueous slurry as high as 100 to 485 ml., except for sodium silicate in runs Nos. 2 and 3, discussed further below.

TABLE II
WATER LOSS TESTS

| Run No. | Accelerator Type | Additive Percent | Water Loss, ml./30 min. |
|---|---|---|---|
| 1 | None | 0.0 | 7.5 |
| 2 | Sodium silicate [1] | 2.0 | 7.5 |
| 3 | Sodium silicate [2] | 1.0 | 7.5 |
| 4 | MgCl$_2$ | 2.0 | 252 |
| 5 | NH$_4$Cl | 2.0 | 101 |
| 6 | FeCl$_3$ | 2.0 | 395 |
| 7 | CuCl$_2$ | 2.0 | 485 |
| 8 | NaAlO$_2$ | 1.0 | 10 |
| 9 | CaCl$_2$ | 0.5 | 249 |
| 10 | CaCl$_2$ | 1.0 | 275 |
| 11 | CaCl$_2$ | 2.0 | 350 |
| 12 | CaCl$_2$ | 4.0 | 414 |

[1] Silicon dioxide to sodium oxide ratio of 2 to 1.
[2] Silicon dioxide to sodium oxide ratio of 2 to 3.

It will be noted that calcium chloride (CaCl$_2$) which is usually used as a cement set accelerator or thickening time decreaser increased the water loss by too great an amount in Table II and therefore could not be employed to accelerate a CMHEC containing Portland cement. The same is true of all the other prior art set accelerators, such as ammonium, iron, copper and magnesium chloride. Sodium aluminate was approximately as good as sodium silicate, the latter is disclosed and claimed in a copending application of another inventor but the same assignee, Serial No. 472,954, filed December 3, 1954, now abandoned after filing continuation-in-part application Serial No. 593,583 on June 25, 1956.

Example B

Table III gives examples of some of the various proportions of materials which are useful in the practice of the present invention within the ranges of Table I in different depth wells.

TABLE III
PARTS BY WEIGHT OF MATERIALS

| Materials in the cement slurry | (Depth of well in feet) | | | |
|---|---|---|---|---|
| | 6,000', parts | 12,000', parts | 14,000', parts | 16,000', parts |
| Portland Cement | 100 | 100 | 100 | 100 |
| Celite | 30 | 20 | 0 | 40 |
| Bentonite | 2 | 2 | 0 | 2 |
| NaCMHEC | 1.5 | 1 | 0.7 | 2 |
| NaAlO$_2$ | 5 | 3 | 2 | 2 |
| Water | 150 | 125 | 55 | 220 |

The above proportions of materials in Table III show how considerable variation in composition can be employed in practicing the invention. The 14,000 foot well composition is given as an example where no Celite nor bentonite is employed, in which case the slurry runs about 15 pounds per gallon, and the Halliburton thickening time to 100 poises is about 5 hours.

Example C

Portland cement slurries were made up having the compositions and resulting properties listed in Table IV.

TABLE IV
PARTS BY WEIGHT

| Slurry No. | A | B | C | D | E | F |
|---|---|---|---|---|---|---|
| Material: | | | | | | |
| Portland cement | 100 | 100 | 100 | 100 | 100 | 100. |
| NaCMHEC | 0.5 | 0.5 | 0.5 | 0.5 | 0.5 | 0.5 |
| NaAlO$_2$ | 0.5 | 0 | 2 | 0 | 3 | 0. |
| Water | 54 | 54 | 70 | 70 | 70 | 70. |
| Properties: | | | | | | |
| 100 poise thickening time, hours and min. at 180° F. | 23 hr., 10 min. | 27 hr. | 11 hr., 55 min. | 30 hr. | 3 hr., 20 min. | 30 hr. |

It will be seen from Table IV that the presence of the sodium aluminate in slurries A, C and E in small amounts of 0.5, 2 and 3 weight percent of the Portland cement substantially reduced the 100 poise thickening time, or time to thicken to 100 poises over that of slurries B, D and F which had no sodium aluminate.

Different densities can be obtained by employing different grades of diatomaceous earth. For example, diatomaceous earth in the form of diatomite may be mined in the Lompoc Hills area of California and may be merely coarsely ground, with or without calination, the grinding being coarse enough to preserve substantially at least a major portion of the structure of the diatom siliceous skeletons, if the lighter weights of cement are preferred, or it may be ground to different degrees of fineness, with or without calcination, to produce heavier cement slurries employing less water. Some reduction in weight and considerable reduction in the amount of water required can be obtained when the diatomite is ground so fine that the diatom siliceous structure is completely destroyed, and aqueous cement slurries prepared according to the above disclosure are still useful in the practice of the present invention. The "Filter-Cel" grade of "Celite" brand diatomaceous earth is one example of a suitable aggregate useful in practicing this invention.

While several illustrative examples have been given above, the invention is not limited thereto.

Having described my invention, I claim:

1. A cement composition consisting essentially of a major portion of a dry hydraulic cement mixed with minor weight percentages of the weight of said dry hydraulic cement of 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.3 to 10% of a cement thickening time reducing agent having substantially no effect on said water loss consisting of an alkali metal aluminate.

2. A cement composition consisting essentially of a major portion of a dry hydraulic cement mixed with minor weight percentages of the weight of said dry hydraulic cement of 1 to 4% bentonite, 15 to 50% of a lightweight aggregate, 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.3 to 10% of a cement thickening time reducing agent having substantially no effect on said water loss consisting of an alkali metal aluminate.

3. A cement composition consisting essentially of a major portion of a dry hydraulic cement mixed with minor weight percentages of the weight of said dry hydraulic cement of 15 to 50% of a lightweight aggregate, 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.3 to 10% of a cement thickening time reducing agent having substantially no effect on said water loss consisting of an alkali metal aluminate.

4. A cement composition consisting essentially of a major portion of a dry hydraulic cement mixed with minor weight percentages of the weight of said dry hydraulic cement of 1 to 4% bentonite, 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and salts of said mixed ethers, and 0.3 to 10% of a cement thickening time reducing agent having substantially no effect on said water loss consisting of an alkali metal aluminate.

5. A cement composition consisting essentially of a major portion of Portland cement mixed with minor weight percentages of the weight of said dry Portland cement of 1 to 4% bentonite, 0.3 to 3% of a cement thickening time extending and water loss reducing agent consisting of an alkali metal carboxymethyl hydroxyethyl cellulose mixed ether, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 1 to 7% of a cement thickening time reducing agent having substantially no effect on said water loss consisting of sodium aluminate.

6. A cement composition consisting essentially of a major portion of Portland cement mixed with minor weight percentages of the weight of said dry Portland cement of 0.3 to 3% of a cement thickening time extending and water loss reducing agent consisting of an alkali metal carboxymethyl hydroxyethyl cellulose mixed ether, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 1 to 7% of a cement thickening time reducing agent having substantially no effect on said water loss consisting of sodium aluminate.

7. A cement composition aqueous slurry consisting essentially of a major portion of a dry Portland cement mixed with minor weight percentages of the weight of said dry Portland cement of 1 to 4% bentonite, 15 to 50% of a light weight aggregate, 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.3 to 10% of a cement thickening time reducing agent having substantially no effect on said water loss consisting of an alkali metal aluminate; and sufficient water to make said slurry fluid.

8. A cement composition aqueous slurry consisting essentially of a major portion of a dry Portland cement mixed with minor weight percentages of the weight of said dry Portland cement of 15 to 50% of a lightweight aggregate, 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.3 to 10% of a cement thickening time reducing agent having substantially no effect on said water loss consisting of an alkali metal aluminate; and sufficient water to make said slurry fluid.

9. A cement composition aqueous slurry consisting essentially of a major portion of a dry Portland cement mixed with minor weight percentages of the weight of said dry Portland cement of 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.3 to 10% of a cement thickening time reducing agent having substantially no effect on said water loss consisting of an alkali metal aluminate; and sufficient water to make said slurry fluid.

10. A cement composition aqueous slurry consisting essentially of a major portion of a dry Portland cement mixed with minor weight percentages of the weight of said dry Portland cement of 1 to 4% bentonite, 0.1 to 10% of a cement thickening time extending and water loss reducing agent consisting of acid carboxyalkyl hydroxyethyl cellulose mixed ethers in which the alkyl group contains 1 to 2 carbon atoms, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15, to 1.2, and salts of said mixed ethers, and 0.3 to 10% of a cement thickening time reducing agent having substantially no effect on said water loss consisting of an alkali metal aluminate; and sufficient water to make said slurry fluid.

11. A cement composition aqueous slurry consisting essentially of a major portion of Portland cement mixed with minor weight percentages of the weight of said dry Portland cement of 15 to 50% of diatomaceous earth, 0.3 to 3% of a cement thickening time extending and water loss reducing agent consisting of an alkali metal carboxymethyl hydroxyethyl cellulose mixed ether, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 1 to 7% of a cement thickening time reducing agent having substantially no effect on said water loss consisting of sodium aluminate; and sufficient water to make said slurry fluid.

12. A cement composition aqueous slurry consisting essentially of a major portion of Portland cement mixed with minor weight percentages of the weight of said dry Portland cement of 0.3 to 3% of a cement thickening time extending and water loss reducing agent consisting of an alkali metal carboxymethyl hydroxyethyl cellulose mixed ether, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 1 to 7% of a cement thickening time reducing agent having substantially no effect on said water loss consisting of sodium aluminate; and sufficient water to make said slurry fluid.

13. In the method of cementing a casing in a well which comprises pumping a cement composition aqueous slurry comprising a hydraulic cement into the annular space between the well casing and the borehole, the step of adding to the cement composition aqueous slurry minor weight percentages of the weight of said dry hydraulic cement of 1 to 4% bentonite, 15 to 50% of a lightweight aggregate, 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.3 to 10% of a cement thickening time reducing agent having substantially no effect on said water loss consisting of an alkali metal aluminate.

14. In the method of cementing a casing in a well which comprises pumping a cement composition aqueous slurry comprising a hydraulic cement into the annular space between the well casing and the borehole, the step of adding to the cement composition aqueous slurry minor weight percentages of the weight of said dry hydraulic cement of 15 to 50% of a lightweight aggregate, 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.3 to 10% of a cement thickening time reducing agent having substantially no effect on said water loss consisting of an alkali metal aluminate.

15. In the method of cementing a casing in a well which comprises pumping a cement composition aqueous slurry comprising a Portland cement into the annular space between the well casing and the borehole, the step of adding to the cement composition aqueous slurry minor weight percentages of the weight of said dry Portland cement of 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers, and 0.3 to 10% of a cement thickening time reducing agent having substantially no effect on said water loss consisting of an alkali metal aluminate.

16. In the method of cementing a casing in a well which comprises pumping a cement composition aqueous slurry comprising a dry Portland cement into the annular space between the well casing and the borehole, the step of adding to the cement composition aqueous slurry minor weight percentages of the weight of said dry Portland cement of 1 to 4 bentonite, 0.1 to 10% of a cement thickening time extending and water loss reducing agent consisting of acid carboxyalkyl hydroxyethyl cellulose mixed ethers in which the alkyl group contains one to two carbon atoms, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and salts of said mixed ethers, and 0.3 to 10% of a cement thickening time reducing agent having substantially no effect on said water loss consisting of sodium aluminate.

17. In the method of cementing a casing in a well which comprises pumping a cement composition aqueous slurry comprising a hydraulic cement into the annular space between the well casing and the borehole, the step of adding to the cement composition aqueous slurry minor weight percentages of the weight of said dry Portland cement of 0.3 to 3% of a cement thickening time extending and water loss reducing agent consisting of an alkali metal carboxymethyl hydroxyethyl cellulose mixed ether, the total substitution per anhydroglucose unit of the cellulose of carboxymethyl and hydroxyethyl groups is between 0.5 to 1.75, the hydroxyethyl substitution is from 0.35 to 1.35, and the carboxymethyl substitution is from 0.15 to 1.2, and 1 to 7% of a cement thickening time reducing agent having substantially no effect on said water loss consisting of sodium aluminate.

References Cited in the file of this patent

UNITED STATES PATENTS

| Number | Name | Date |
|---|---|---|
| 1,656,984 | McCormick | Jan. 24, 1928 |
| 2,152,308 | Greb | Mar. 28, 1939 |
| 2,285,302 | Patterson | June 2, 1942 |
| 2,391,493 | Wainer et al. | Dec. 25, 1945 |
| 2,427,683 | Ludwig | Sept. 23, 1947 |
| 2,439,833 | Wagner | Apr. 20, 1948 |
| 2,471,632 | Ludwig | May 31, 1949 |
| 2,526,674 | Larsen | Oct. 24, 1950 |
| 2,580,565 | Ludwig | Jan. 1, 1952 |
| 2,582,459 | Salathiel | Jan. 15, 1952 |
| 2,598,675 | Cutforth | June 3, 1952 |
| 2,629,667 | Kaveler | Feb. 24, 1953 |
| 2,673,810 | Ludwig | Mar. 30, 1954 |

FOREIGN PATENTS

| Number | Country | Date |
|---|---|---|
| 231,535 | Great Britain | June 3, 1926 |